Jan. 1, 1963  J. LECLABART  3,071,142
DEVICE FOR VENTILATING HEATING SLEEVES FOR HAIR WAVING
Filed Oct. 6, 1960

INVENTOR

JEAN LECLABART

BY Cameron, Kerkam & Sutton
ATTORNEYS

United States Patent Office 3,071,142
Patented Jan. 1, 1963

3,071,142
DEVICE FOR VENTILATING HEATING SLEEVES FOR HAIR WAVING
Jean Leclabart, 53 Ave. Raymond Poincare, Paris, France
Filed Oct. 6, 1960, Ser. No. 60,909
Claims priority, application France Mar. 1, 1960
1 Claim. (Cl. 132—48)

The present invention has for its object a device for ventilating heating sleeves for hair waving and holding them in position in the heating appliances.

It is known that the heating sleeves disposed on the bars of the heating appliances have a tendency to tilt about these bars and this constitutes an impediment to their convenient removal from the appliance for the purpose of utilising them. It is known, moreover, that the two lips of the sleeves, which have a thickness which is necessarily small with respect to the other parts of the sleeve, have a tendency to be hotter than the thicker parts when the sleeve is removed from the appliance and may on that account transmit to the scalp temperatures which are difficult to bear.

The object of the invention is, on the other hand, to maintain all the sleeves disposed on one and the same heating bar in a given alignment and, on the other hand, to protect those parts of the sleeves which are designed to be located in the vicinity of the scalp from too intense a heating action.

According to the invention, the device comprises fixed rods each disposed parallel to one of the heating bars and at a given distance from the bar, said fixed rods being inserted between the lips of the sleeves when they are placed in position, the free space between each bar and the corresponding rod forming a duct for evacuating the heat given off in the vicinity of the lips of the sleeve.

Figure 1:
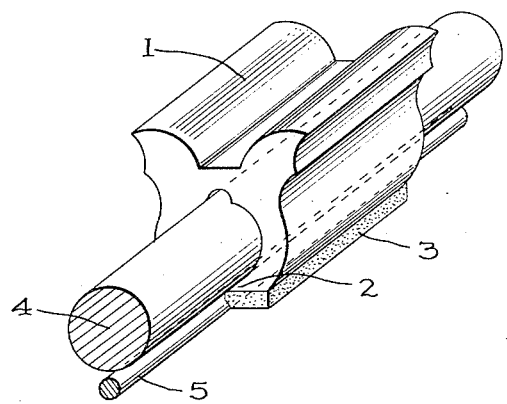

In the accompanying drawing, FIGURE 1 shows in perspective a sleeve 1 the lips 2 of which are provided with insulating pads or coverings 3 and which is disposed on a heating bar 4. A guide rod 5 of cylindrical cross-section is disposed parallel to the bar 4.

Figure 2:
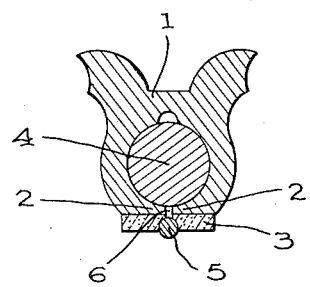

FIGURE 2 of the accompanying drawing is a cross-section showing the pads 3 bearing, while being slightly deformed, against the rod 5. The sleeve 1 is thus prevented from rotating. The heating of the sleeve 1 by the bar 4 is effected under the usual conditions, but the space 6 separating the rod 5 from the bar 4 forms a duct enabling part of the heat absorbed by the lips 2 of the sleeve to be dissipated. The lips 2 of the sleeve are thus protected from too intense heating.

The rods 5 are preferably made of a material having a low thermal conductivity.

What I claim is:

In combination, a heating appliance for heating sleeves for hair waving and ventilating the lips of the sleeves when holding the heating sleeves in position on a heating bar, a heating bar comprising an element of said appliance, a fixed rod disposed parallel to said heating bar, at least one removable sleeve on said bar, each of said sleeves having spaced lips, an insulating pad on each of said lips, said fixed rod being located between pads on said lips of said sleeves when said sleeves are in position on said heating bar, said rod being spaced from said bar and forming a duct for evacuating heat from the vicinity of said lips of said sleeves.

References Cited in the file of this patent
UNITED STATES PATENTS

| | | |
|---|---|---|
| 351,331 | Lonsdale et al. | Oct. 19, 1886 |
| 1,022,184 | Dutton | Apr. 2, 1912 |
| 2,133,573 | Rifle | Oct. 18, 1938 |
| 2,161,203 | Schleimer | June 6, 1939 |
| 2,443,133 | Fry | June 8, 1948 |
| 2,491,939 | Tasho | Dec. 20, 1949 |